(12) United States Patent
Phadke (10) Patent No.: US 9,923,472 B1
(45) Date of Patent: Mar. 20, 2018

(54) FIXED FREQUENCY SERIES-PARALLEL MODE (SPM) ACTIVE CLAMP FLYBACK CONVERTER

(71) Applicant: Apple Inc., Cupertino, CA (US)

(72) Inventor: Vijay G. Phadke, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/405,901

(22) Filed: Jan. 13, 2017

Related U.S. Application Data (60) Provisional application No. 62/384,244, filed on Sep. 7, 2016.

(51) Int. Cl.
*H02M 3/335* (2006.01)
*H02M 1/34* (2007.01)

(52) U.S. Cl.
CPC ......... *H02M 3/33507* (2013.01); *H02M 1/34* (2013.01); *H02M 2001/342* (2013.01)

(58) Field of Classification Search
CPC ............... H02M 3/33507; H02M 1/34; H02M 2001/342
See application file for complete search history.

(56) References Cited

U.S. PATENT DOCUMENTS

| 6,069,803 | A | * | 5/2000 | Cross | ................ H02M 3/33569 363/21.14 |
|---|---|---|---|---|---|
| 6,191,960 | B1 | | 2/2001 | Fraidlin | |
| 7,006,364 | B2 | * | 2/2006 | Jin | .......................... H02M 1/08 363/131 |
| 7,554,820 | B2 | | 6/2009 | Stanley | |
| 7,869,235 | B2 | * | 1/2011 | Lin | ......................... H02M 1/34 363/21.18 |
| 8,315,073 | B2 | | 11/2012 | Matsumoto | |
| 2014/0185333 | A1 | * | 7/2014 | Yang | ................. H02M 3/33569 363/21.12 |
| 2014/0334194 | A1 | | 11/2014 | Davila | |

\* cited by examiner

*Primary Examiner* — Jue Zhang
(74) *Attorney, Agent, or Firm* — Blank Rome LLP (57) ABSTRACT

A flyback converter can include a series-parallel mode (SPM) active clamp circuit. The active clamp circuit, coupled in parallel with the primary coil, may include multiple networks in parallel. The first network, comprising a switch, one or more snubber capacitors, and one or more diodes, may be configured to absorb and retain the leakage energy from the leakage inductance of the flyback converter. The second network, comprising another switch and a diode, may be configured to create a circulating circuit for the flow of current through the primary coil in a reverse direction and clamp the current to a threshold level. With the active clamp circuit, the flyback converter may first re-capture the leakage energy in the active clamp circuit and then recover it back to the power source.

22 Claims, 8 Drawing Sheets

OPERATIONAL STAGE III

FIXED FREQUENCY SERIES-PARALLEL MODE (SPM) ACTIVE CLAMP FLYBACK CONVERTER

CROSS REFERENCE TO RELATED APPLICATIONS

This application claims priority under 35 U.S.C. §119(e) to U.S. Provisional Application Ser. No. 62/384,244, entitled "Fixed Frequency Series-Parallel Mode (SPM) Active Clamp Flyback Converter", filed on Sep. 7, 2016, the contents of which is herein incorporated by reference.

TECHNICAL FIELD

This disclosure relates generally to the field of power converters, and in particular, to flyback converters with a series-parallel mode (SPM) active clamp circuit.

BACKGROUND

Flyback converter is one of the most common types of power converters in low-power, switched-mode power supplies. They are widely used in, e.g., electronic gadgets, cell phones, notebook computers, and/or other types of consumer electronics, especially when galvanic isolation is needed between input power source(s) and output load(s). A flyback converter may comprise a primary coil and a secondary coil, which are electromagnetically coupled with each other. By controlling the flow of current through the primary coil using a switch (a metal oxide semiconductor field-effect transistor (MOSFET), for example), energy may be transferred from the power source (coupled to the primary coil) to the load (coupled to the secondary coil).

In practice, the primary and secondary coils may have an associated parasitic leakage inductance that also captures energy. The leakage inductance may cause additional losses unless its leakage energy is recovered. For consumer electronics, especially battery operated electronics, the energy recovery may become even more important because of limited power availability and thermal management challenges in miniaturized electronics. Another practical challenge is the mitigation of electromagnetic interference (EMI). Flyback converters, being operated by turning on and off switches, may generate EMI. Specific features in consumer electronics may place EMI constraints on a power supply of such device. For example, the "Multi-Touch" technology used with touch screens may demand low common-mode noise within specific frequency band(s). Such requirements may require flyback converters to be operated at appropriate fixed switching frequencies. Therefore, the inventor has recognized the need for a flyback converter capable of recovering the leakage energy in high efficiency and operable with fixed switching frequencies.

SUMMARY

Disclosed herein is a flyback converter with a series-parallel mode (SPM) active clamp circuit. In some embodiments, the flyback converter may comprise electromagnetically coupled primary and secondary coils. By using a first switch (for example, a MOSFET) the flyback converter may transfer energy from a power source (coupled to the primary coil) to a load (coupled to the secondary coil). In some embodiments, the flyback converter may also comprise an active clamp circuit coupled in parallel with the primary coil. The active clamp circuit may include multiple networks in parallel. The first network of the active clamp circuit may include a second switch (for example, a second MOSFET), one or more snubber capacitors, and one or more diodes, which may be configured to absorb and retain the leakage energy from the leakage inductance of the flyback converter. The second network of the active clamp circuit may include a third switch (for example, a third MOSFET) and a diode, which may be configured to (1) create a circulating circuit for the flow of current through the primary coil in a reverse direction and (2) clamp the current to a threshold level. With the active clamp circuit, the flyback converter may first re-capture the leakage energy in the active clamp circuit and then recover it back to the power source. Additionally, in some embodiments, the active clamp circuit may also facilitate zero-voltage switching (ZVS), for example, for the first and second switches at turning-on, which may further improve the flyback converter's efficiency.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one" or "another" embodiment in this disclosure are not necessarily to the same or different embodiment, and they mean at least one. In order to be concise, a given figure may be used to illustrate the features of more than one embodiment, or more than one species of the disclosure, and not all elements in the figure may be required for a given embodiment or species.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
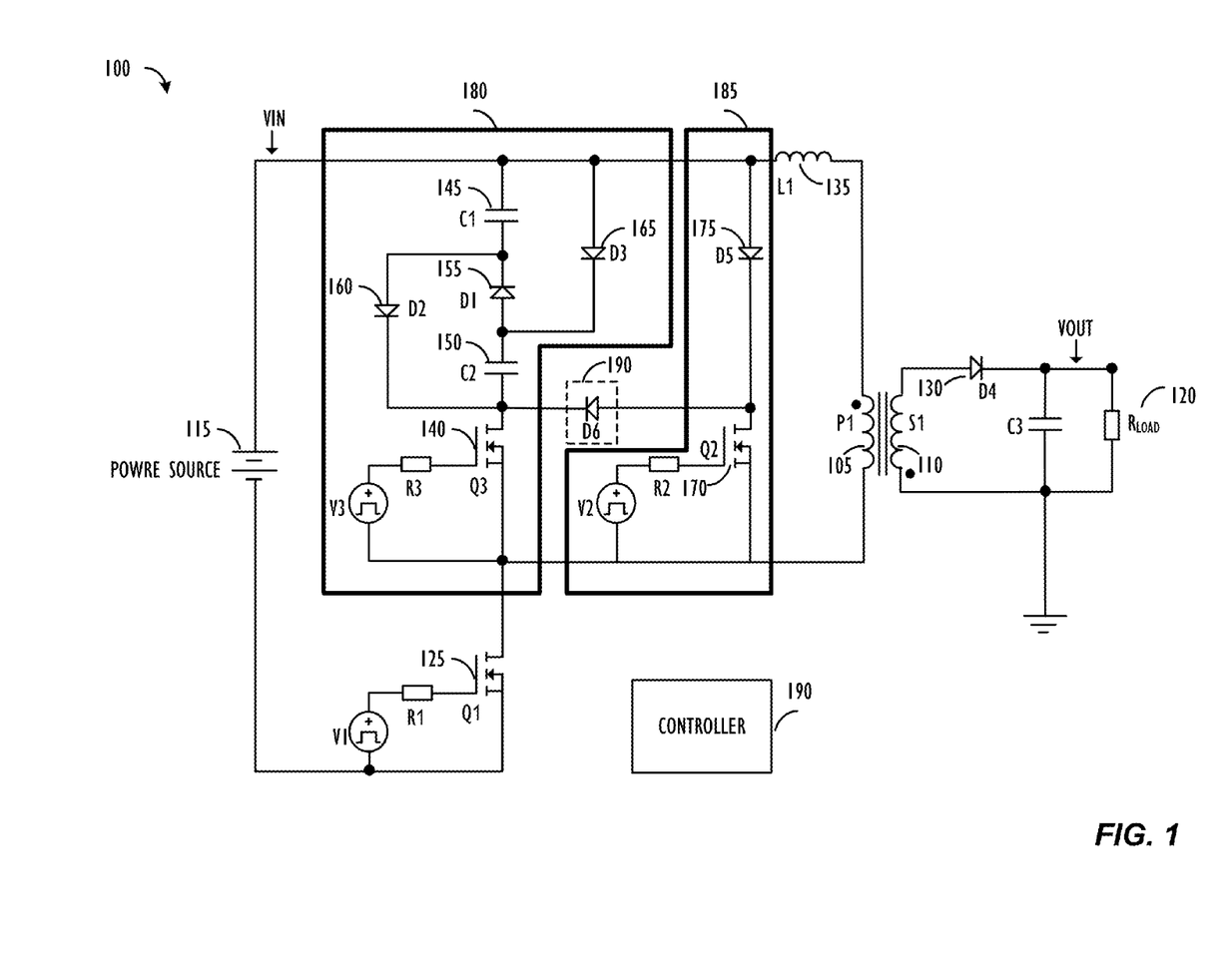
FIG. 1 is schematic diagram illustrating exemplary SPM active clamp flyback converter 100 in accordance with one embodiment.

FIG. 1 is a schematic diagram illustrating exemplary series-parallel mode ("SPM") active clamp flyback converter 100 in accordance with one embodiment. Flyback converter 100 may include primary coil P1 105 and secondary coil S1 110, which may be electromagnetically coupled with each other. Primary coil P1 105 may receive an input voltage $V_{IN}$ from power source 115, while secondary coil S1 110 may supply an output voltage $V_{OUT}$ to load 120 (for example, resistor $R_{LOAD}$) through diode D4 130, as shown in FIG. 1. To simplify explanations, it may be assumed that primary coil P1 105 and secondary coil S1 110 possess an ideal electromagnetic coupling, meaning a flow of current through primary coil P1 105 may transfer the complete energy stored in primary coil P1 105 to secondary coil S1 110. Leakage inductance of flyback converter 100, including leakage inductance of primary coil P1 105 and/or secondary coil S1 110, may be represented by leakage inductance L1 135, as shown in FIG. 1. Leakage inductance L1 135 may capture a leakage energy that is not transferred from the primary coil to the secondary coil.

Flyback converter 100 may further comprise switch Q1 125, for example, a first MOSFET, coupled in series between power source 115 and primary coil P1 105. Also, flyback converter 100 may include snubber network 180 and reverse circulating network 185, each of which may be coupled in parallel with primary coil P1 105 (and leakage inductance L1 135) and two of which may form an active clamp circuit. In one embodiment, snubber network 180 may comprise switch Q3 140, for example, a second MOSFET, in series with snubber capacitors C1 145 and C2 150, and diode D1 155. A second diode D2 160 may be coupled in parallel across snubber capacitor C2 150 and diode D1 155, and a third diode D3 165 may be coupled in parallel across snubber capacitor C1 145 and diode D1 155. Reverse circulating network 185 may include switch Q2 170, for example, a third MOSFET, in series with diode D5 175. Operation of snubber network 180 and reverse circulating network 185 as an active clamp circuit will be described in further detail below. Flyback converter 100 may also include controller 190, which may be coupled to switches Q1 125, Q2 170 and Q3 140 and generate controls signals for the switches, respectively. Flyback converter 100 may further include an optional diode D6 190, which couples snubber network 180 with reverse circulating network 185. Referring to FIG. 1, diode D6 190 may be coupled between the drains of switches Q3 140 (of snubber network 180) and Q2 170 (of reverse circulating network 185). The purpose and functionality of optional diode D6 190 will be described in the following sections.

FIG. 1 also depicts gate drive circuits for switch Q1 125 (comprising voltage source V1 and resistor R1), switch Q2 170 (comprising voltage source V2 and resistor R2), and switch Q3 140 (comprising voltage source V3 and resistor R3), respectively. Note that switches Q1 125, Q2 170 and Q3 140 may each comprise an intrinsic anti-parallel body diode and a parallel effective capacitance, which are not shown in FIG. 1. As an alternative to MOSFETs, flyback converter 100 may use other types of switches, for example, insulated gate bipolar transistors (IGBTs), junction gate field-effect transistors (JFETs), and silicon carbine and/or gallium nitride devices. Note that instead of using diode D4 130, flyback converter 100 may use other types of switches, for example, a MOSFET, to provide synchronous rectification.

Figure 2:
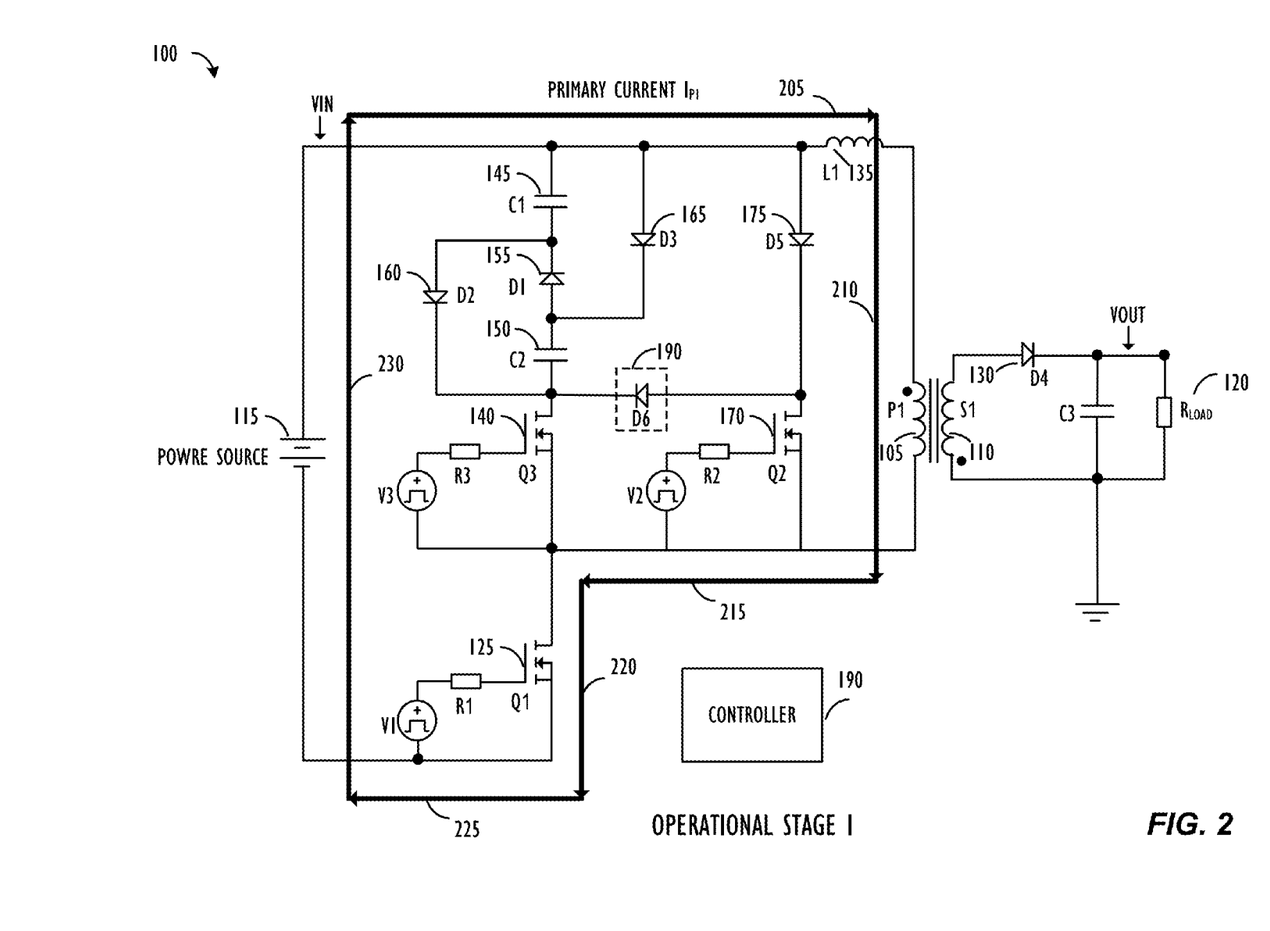
FIG. 2 illustrates the flow of current through the primary coil of exemplary flyback converter 100 in Operational Stage I in accordance with one embodiment.

Operations of flyback converter 100 may be explained in sequential Operational Stages I-V, which are schematically illustrated in FIGS. 2-7. FIG. 2 illustrates operations of flyback converter 100 in Operational Stage I. In Operational Stage I, flyback converter 100 may turn on (or close) switch Q1 125, for example, by a first control signal with a fixed frequency, and maintain switches Q2 170 and Q3 140 off, by using controller 190 of flyback converter 100. When switch Q1 125 is closed, current will flow from power source 115 through primary coil P1 105, through switch Q1 125, as illustrated by lines 205-230. The current flowing through primary coil P1 105 is hereinafter referred to as the primary current $I_{P1}$. As the primary current $I_{P1}$ in primary coil P1 105 builds up, the induced voltage across the secondary coil S1 110 may place diode D4 130 into reverse bias, thus blocking a flow of current from secondary coil S1 110 to load 120. Because energy is not being transferred to the secondary coil, the energy delivered by power source 115 may be accumulated (or stored) in primary coil P1 105. Further, as the primary current $I_{P1}$ also flows through leakage inductance L1 135, leakage inductance L1 135 may store a leakage energy.

Figure 3:
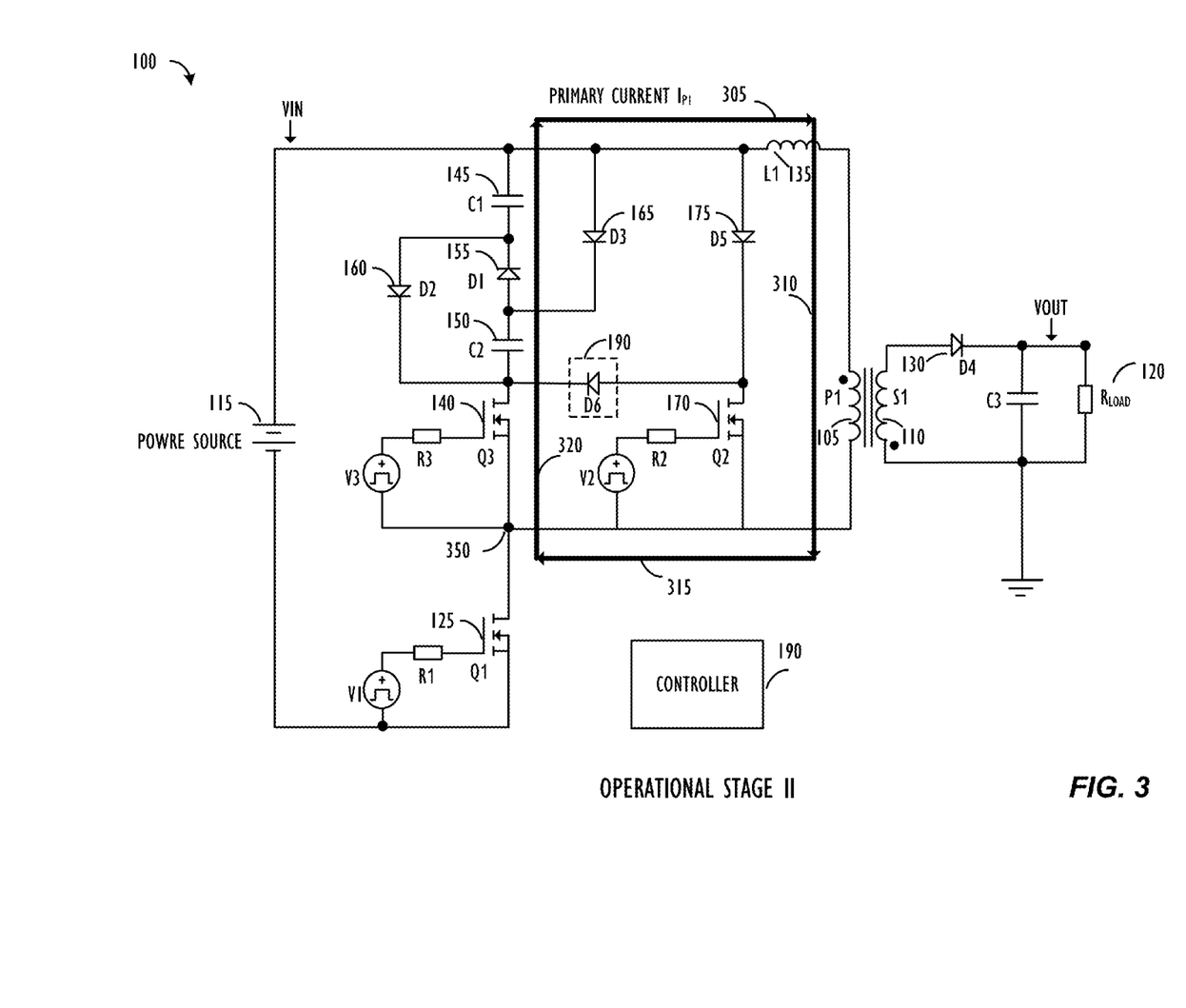
FIG. 3 illustrates the flow of current through the primary coil of exemplary flyback converter 100 in Operational Stage II in accordance with one embodiment.

FIG. 3 illustrates operations of flyback converter 100 in Operational Stage II. In Operational Stage II, by using controller 190, flyback converter 100 may turn off (or open) switch Q1 125, and after a first delay, turn on switches Q3 140 and Q2 170, for example, by a second and third control signals with respective fixed frequencies. The first delay may be inserted to facilitate zero voltage switching ("ZVS"), for example, turning-on under zero voltage, for switch Q3 140, as well as prevent occurrences of short-circuit faults through the switches. In Operational Stage II, the primary current $I_{P1}$ through primary coil P1 105 may decline as the primary coil has been disconnected from power source 115 by turning off switch Q1 125. This may generate an induced voltage across secondary coil S1 110 that causes diode D3 130 to become forward biased and begin to conduct, thus delivering the stored energy from primary coil P1 105 to secondary coil S1 110 and load 120. Meanwhile, after switch Q1 125 is turned off but before switch Q3 140 is turned on (i.e., during the first delay), the primary current $I_{P1}$ may be forced to flow through the body diode (not shown) of switch Q3 140 and diode D1 155 into snubber capacitors C1 145 and C2 150, as indicated by lines 305-320. Snubber capacitors C1 145 and C2 150 may be charged in series, and the leakage energy may be transferred from leakage inductance L1 135 to the two snubber capacitors. Note that flyback converter 100 may further include optional diode D6 190, and first turn on switch Q3 140 and then switch Q2 170 to achieve ZVS for switch Q2 170. For example, after switch Q3 140 is closed, it may create an approximately zero voltage across switch Q3 140. Through diode D6 190, it may clamp the voltage across switch Q2 170 (between switch Q2 170's drain and source) to approximately zero as well. Therefore, flyback converter 100 may turn on switch Q2 170 at ZVS. When Q2 170 turns on, the energy stored in the parasitic capacitance of its output capacitance (not shown) may dissipate in switch Q2 170 as turn-on power loss. Optional diode D6 190 may ensure that the energy stored in this capacitance is recovered when leakage energy is transferred to snubber capacitors C1 145 and C2 150.

During the first delay, the body diode of switch Q3 140 may conduct, which may bring down the voltage across switch Q3 140 to approximately zero. Thus, flyback converter 100 may turn on switch Q3 140 under zero voltage, e.g., after the first delay. Meanwhile, flyback converter 100 may also turn on switch Q2 170. The ZVS may further reduce losses and improve flyback converter 100's efficiency. Once switches Q3 140 and Q2 170 are closed, the primary current $I_{P1}$ may change from flowing through the body diode of switch Q3 140 to flowing through switch Q3 140 itself, thus continuously charging snubber capacitors C1 145 and C2 150. The total stored energy in snubber capacitors C1 145 and C2 150 may depend on the snubber capacitors' respective voltages. In particular, the energy may be determined according to equation (1):

$$E_{snubber} = 0.5 \times [Cap_1 \times V_{C1}^2 + Cap_2 \times V_{C2}^2] \quad (1)$$

where $Cap_1$ and $Cap_2$ are the respective capacitances of snubber capacitors C1 145 and C2 150, and $V_{C1}$ and $V_{C2}$ are the respective voltages across snubber capacitors C1 145 and C2 150.

The voltages $V_{C1}$ and $V_{C2}$ of snubber capacitors C1 145 and C2 150 may be determined by the reflected output voltage $V_{OR}$ across primary coil P1 105 and an induced leakage voltage $V_{L1}$ across leakage inductance L1 135. To simplify explanations, snubber capacitors C1 145 and C2 150 may be assumed to have equal capacitances. Thereby, each snubber capacitors C1 145 and C2 150 may be charged to half of the reflected output voltage $V_{OR}$, plus half of the induced leakage voltage $V_{L1}$ (e.g., $V_{C1}=V_{C2}=0.5\times(V_{OR}+V_{L1})$). The reflected output voltage $V_{OR}$ across primary coil P1 105 may be determined by equation (2):

$$V_{OR} = (V_{OUT} + V_{f\_D4}) \times (Np/Ns) \quad (2)$$

where $V_{OUT}$ is the output voltage of flyback converter 100, $V_{f\_D4}$ is the forward voltage drop across diode D4 130, and Np/Ns represents the turns-ratio between primary coil P1 105 and secondary coil S1 110. For example, if flyback converter 100 converts 300V input voltage (e.g., $V_{IN}$=300V) to 5V voltage (e.g., $V_{OUT}$=5V), the turns-ratio Np/Ns between the primary and secondary coils is 14:1, and the forward voltage drop across diode D4 130 is 0.7V, the reflected output voltage $V_{OR}$ may be (5+0.7)×14=79.8V. Each snubber capacitor C1 145 and C2 150 may be charged, for example, at least to a voltage equal to half of the reflected voltage $V_{OR}$, and may be further charged higher by absorbing the leakage energy from leakage inductance L1 135. In the above example, if each snubber capacitor C1 145 and C2 150 is charged to 50V, then the charge corresponding to 40V (i.e., 79.8/2≅40V) is due to reflected output voltage $V_{OR}$ and the charge of additional 10V (to reach 50V level) is due to half of the leakage energy. The reflected output voltage $V_{OR}$ may remain substantially constant because flyback converter 100's output voltage $V_{OUT}$ may be regulated to a constant level under different loading conditions, while the induced leakage voltage $V_{L1}$ may increase and/or decrease with the loading condition of flyback converter 100.

Once the leakage energy of leakage inductance L1 135 is transferred to the series combination of snubber capacitors C1 145 and C2 150, diode D1 155 may block a flow of current in the reverse direction. Further, since the respective voltages $V_{C1}$ and $V_{C2}$ of snubber capacitors C1 145 and C2 150 are less than the total voltage $V_{TOTAL}$ across primary coil P1 105 and leakage inductance L1 135 (e.g., $V_{TOTAL}=V_{OR}+V_{L1}$), diodes D2 160 and D3 165 may become reverse biased. Snubber capacitors C1 145 and C2 150 may thus be disconnected from primary coil P1 105, which causes C1 145 and C2 150 to retain the leakage energy that they absorbed from leakage inductance L1 135. Note that the positive polarity of the voltages $V_{C1}$ and $V_{C2}$ is from bottom end to top end of each snubber capacitor C1 145 and C2 150, which aligns with the direction of primary current $I_{P1}$ that charges the two snubber capacitors in series. Accordingly, the voltage $V_{Q1}$ across switch Q1 125 may become the sum of the voltages $V_{C1}$, $V_{C2}$, and input voltage $V_{IN}$, for example, $V_{Q1}=V_{C1}+V_{C2}+V_{IN}\cong400V$ by using the exemplary numerical values given above.

When the energy of primary coil P1 105 is depleted and transferred to the secondary coil, primary coil P1 105 may resonate with the effective capacitance (not shown) of switch Q1 125 with minimum losses, which may cause the voltage potential at switch Q1 125's drain node 350 to fall. When the total voltage $V_{TOTAL}$ across primary coil P1 105 and leakage inductance L1 135 falls below the respective voltages $V_{C1}$ and $V_{C2}$ of snubber capacitors C1 145 and C2 150, diodes D2 160 and D3 165 may become forward biased and begin to conduct. Further, if the voltages $V_{C1}$ and $V_{C2}$ are equal, diodes D2 160 and D3 165 may begin to conduct at about the same time. Flyback converter 100 may thus move into Operational Stage III, as illustrated in FIGS. 4 and 5.

Figure 4:
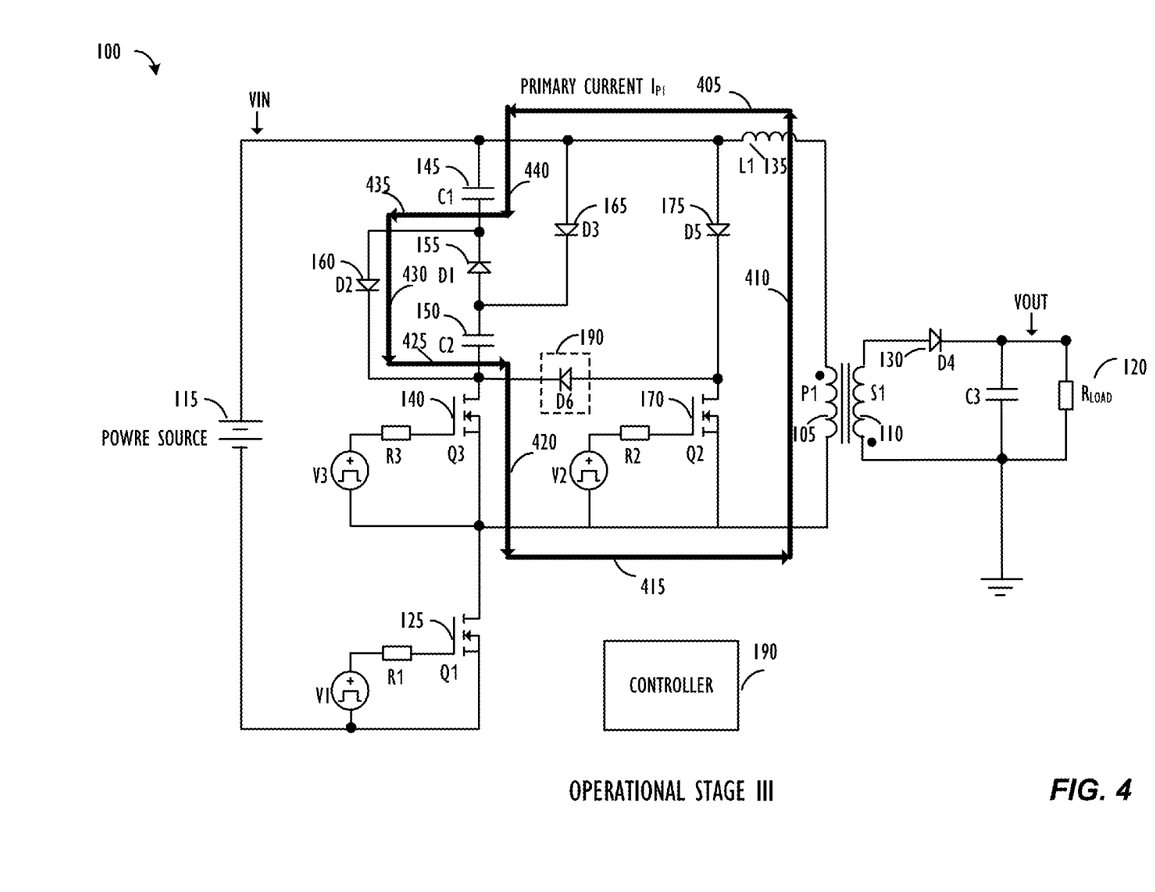
FIG. 4 illustrates the flow of current through the primary coil and a first snubber capacitor of exemplary flyback converter 100 in Operational Stage III in accordance with one embodiment.
Figure 5:
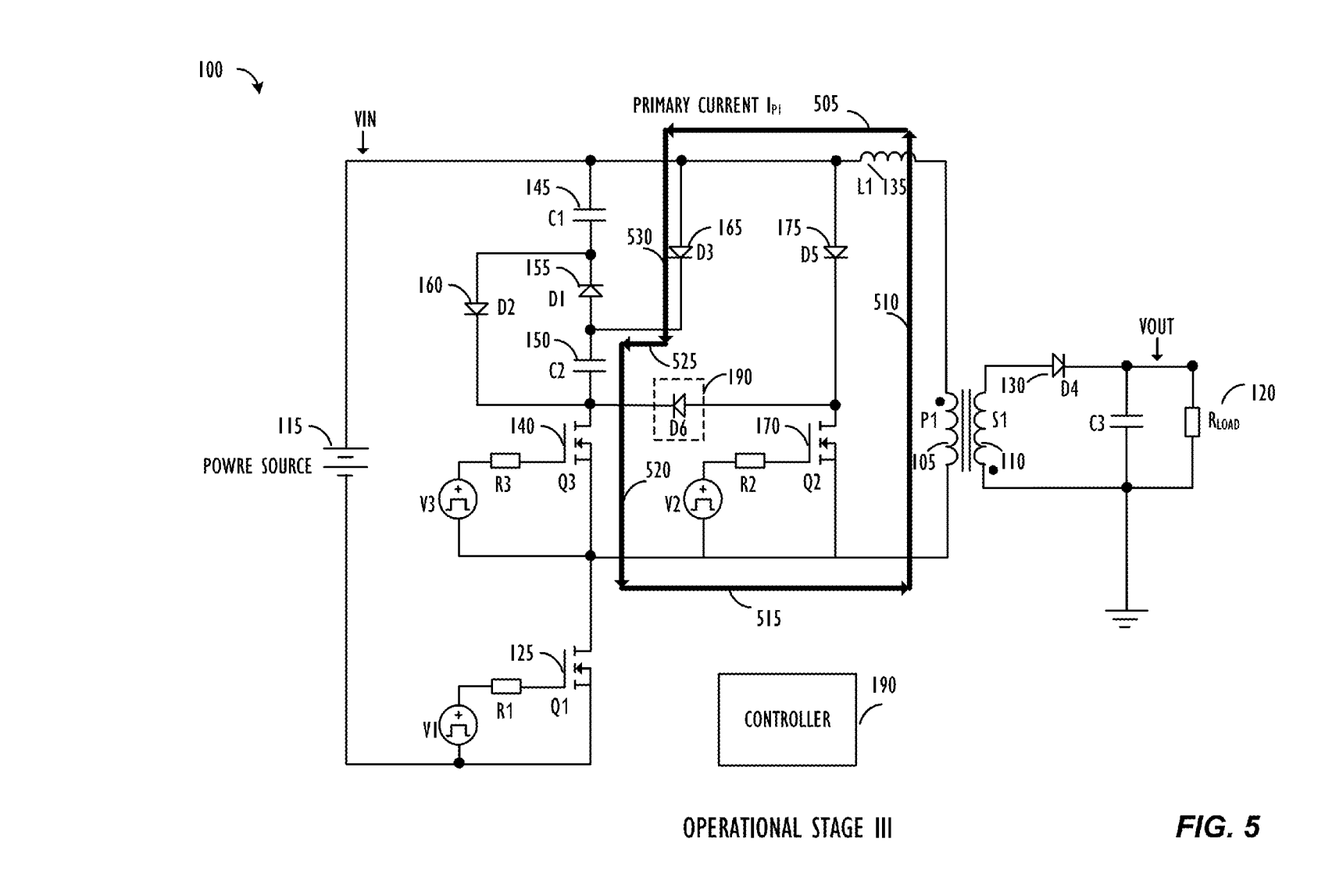
FIG. 5 illustrates the flow of current through the primary coil and a second snubber capacitor of exemplary flyback converter 100 in Operational Stage III in accordance with one embodiment.

Referring to FIGS. 4 and 5, because switch Q3 140 remains closed, snubber capacitors C1 145 and C2 150 may reconnect with primary coil P1 105 in parallel. The two snubber capacitors may transfer their stored leakage energy to primary P1 105 (in a resonant manner with minimum losses), thereby generating a reverse primary current $I_{P1}$, as indicated by lines 405-440 in FIGS. 4 and 505-530 in FIG. 5. Because snubber capacitors C1 145 and C2 150 are in parallel, the voltage $V_{Q1}$ across switch Q1 125 may become the sum of voltage $V_{C1}$ (or $V_{C2}$ if $V_{C2}$ equals to $V_{C1}$) and input voltage $V_{IN}$, for example, $V_{Q1}=V_{C1}+V_{IN}\cong350V$ by using the exemplary numerical values given above. Note that optional diode D6 190 may block the reverse primary current $I_{P1}$ flowing from snubber network 180 into reverser circulating network 185.

Figure 6:
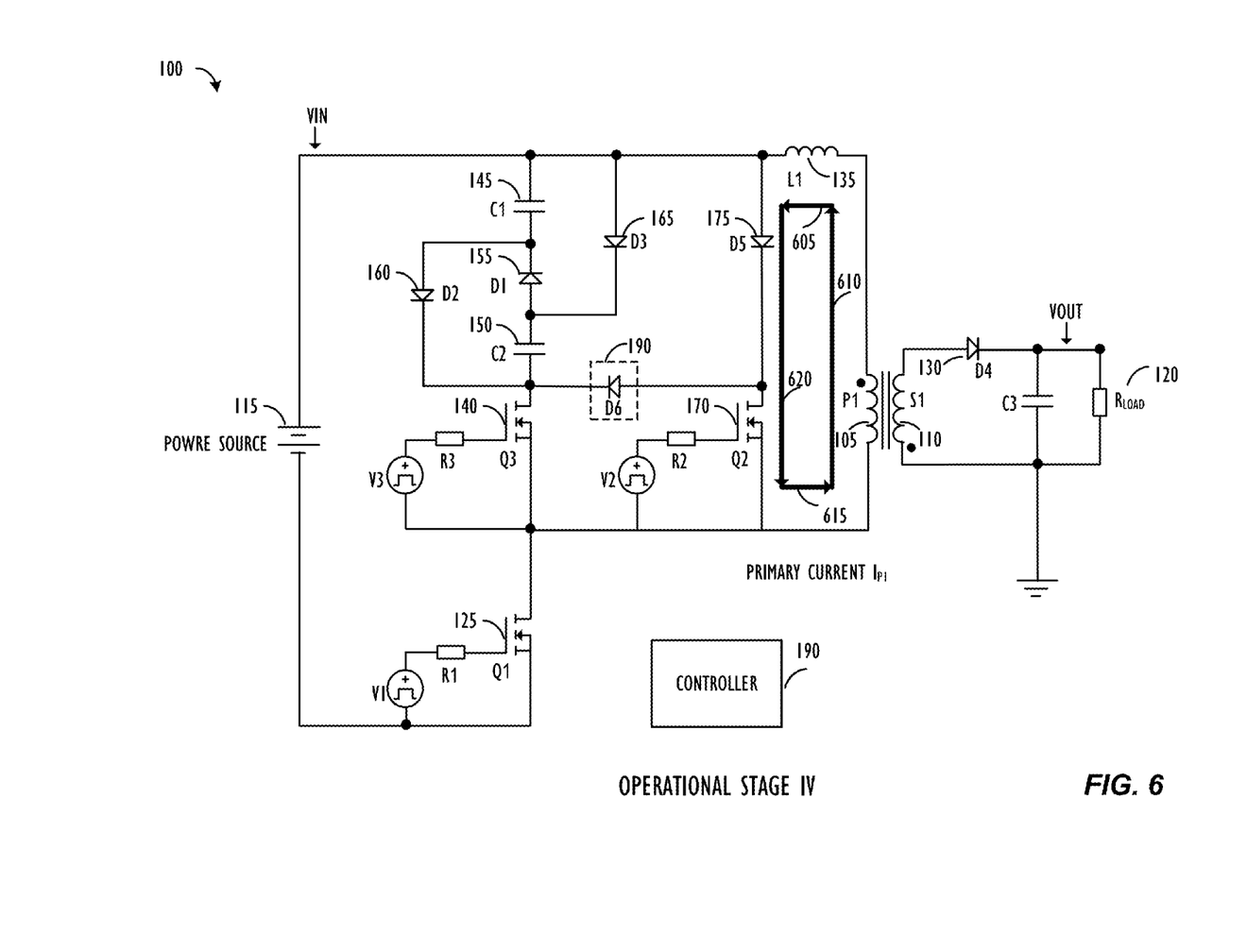
FIG. 6 illustrates the flow of current through the primary coil of exemplary flyback converter 100 in Operational Stage IV in accordance with one embodiment.

When the reverse primary current $I_{P1}$ reaches a predetermined threshold level, flyback converter 100 may turn off switch Q3 140 and move into Operational Stage VI, as shown in FIG. 6. As switch Q2 170 still remains closed, switch Q2 170 and diode D5 175 may create a circulating circuit for the reverse primary current $I_{P1}$ as shown by lines 605-620. The resistivity of the circulating circuit of switch Q2 170, D5 175, primary coil P1 105 and leakage inductance L1 135 may be configured to be small. Thus, the amplitude of the reverse primary current $I_{P1}$ may be clamped at or marginally below the predetermined threshold level. Additionally, as switch Q2 170 and diode D5 175 may generate only small voltage drops, the voltage $V_{Q1}$ across switch Q1 125 may approximately equal to input voltage $V_{IN}$, for example, $V_{Q1}\cong V_{IN}$=300V by using the exemplary numerical values given above.

Figure 7:
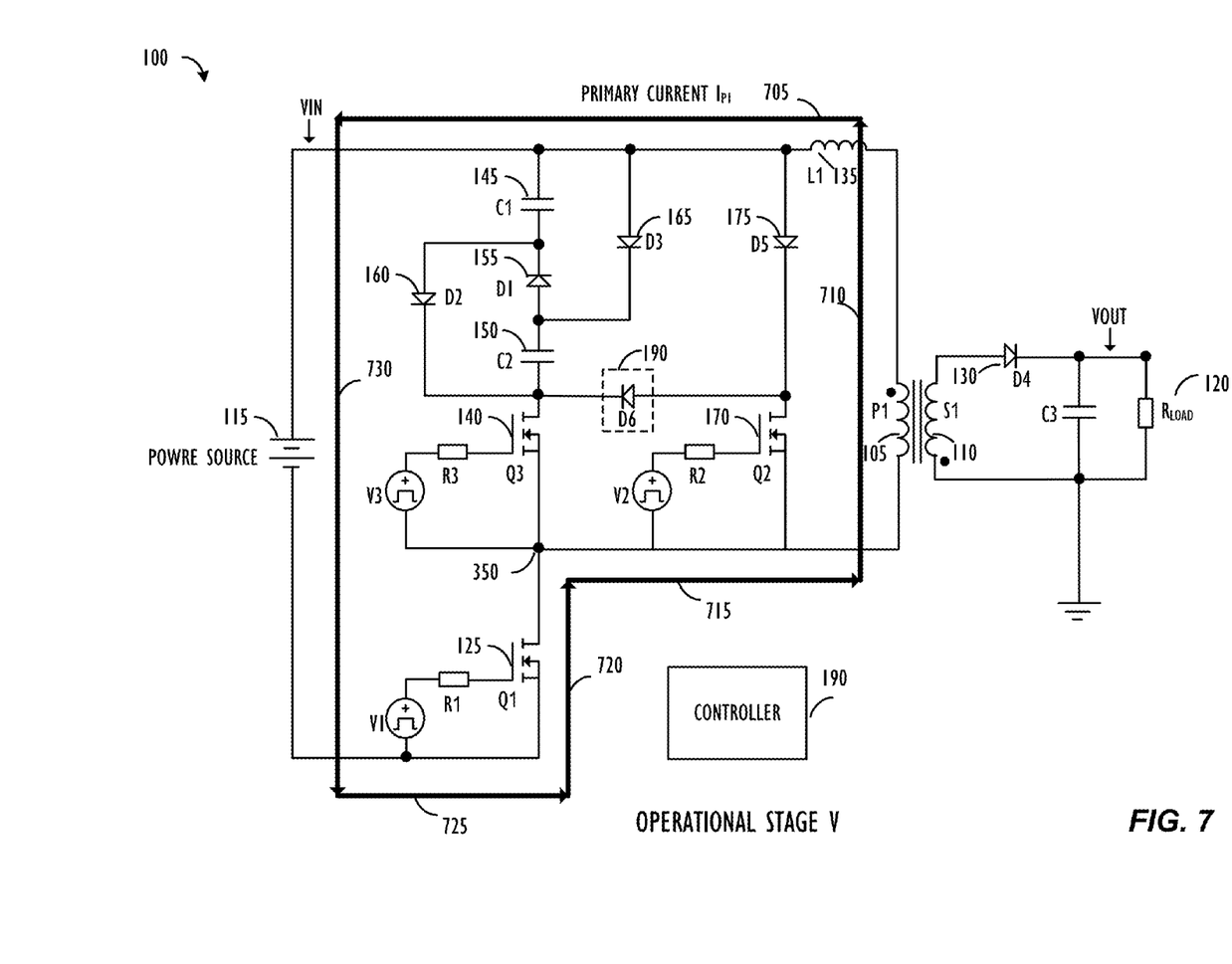
FIG. 7 illustrates the flow of current through the primary coil of exemplary flyback converter 100 in Operational Stage V in accordance with one embodiment.

FIG. 7 illustrates the Operational Stage V of flyback converter 100. In Operational Stage V, flyback converter 100 may turn off switch Q2 170, and after a second delay, turn on switch Q1 125. The second delay may be inserted to facilitate ZVS, for example, turning-on under zero voltage, for switch Q1 125, as well as prevent occurrences of short-circuit faults through the switches. In Operational Stage V, the reverse primary current $I_{P1}$ may be directed to flow through the effective capacitance of switch Q1 125 (not shown), because switch Q2 170 is turned off. Primary coil P1 105, leakage inductance L1 135, and the effective capacitance of switch Q1 125 may operate in a resonant manner with minimum losses, causing the voltage potential at switch Q1 125's drain node 350 to fall towards zero. As the voltage potential of drain node 350 reduces, the body diode of switch Q1 125 (not shown) may begin to conduct. The conduction of the body diode may cause the voltage $V_{Q1}$ across switch Q1 125 to fall to approximately zero. Therefore, flyback converter 100 may turn on switch Q1 125 under a zero-voltage condition, e.g., after the second delay. The ZVS may further reduce losses and improve flyback converter 100's efficiency. Once switch Q1 125 is closed, the reverse primary current $I_{P1}$ of primary coil P1 105 may flow into power source 105, as illustrated by lines 705-730 in FIG. 7, thus recovering the leakage energy stored in primary coil P1 105 back to power source 115.

As may now be better understood with reference to FIGS. 1-7, snubber network 180 may use snubber capacitors C1 145 and C2 150 to absorb and retain the leakage energy released from leakage inductance L1 135, while reverse circulating network 185 may create a circulating circuit to clamp the reverse primary current of primary coil P1 105 to a threshold level. Next, when both of the networks are disconnected from primary coil P1 105 by using switches Q3 140 and Q2 170, flyback converter 100 may recover the leakage energy back to power source 115.

Figure 8:
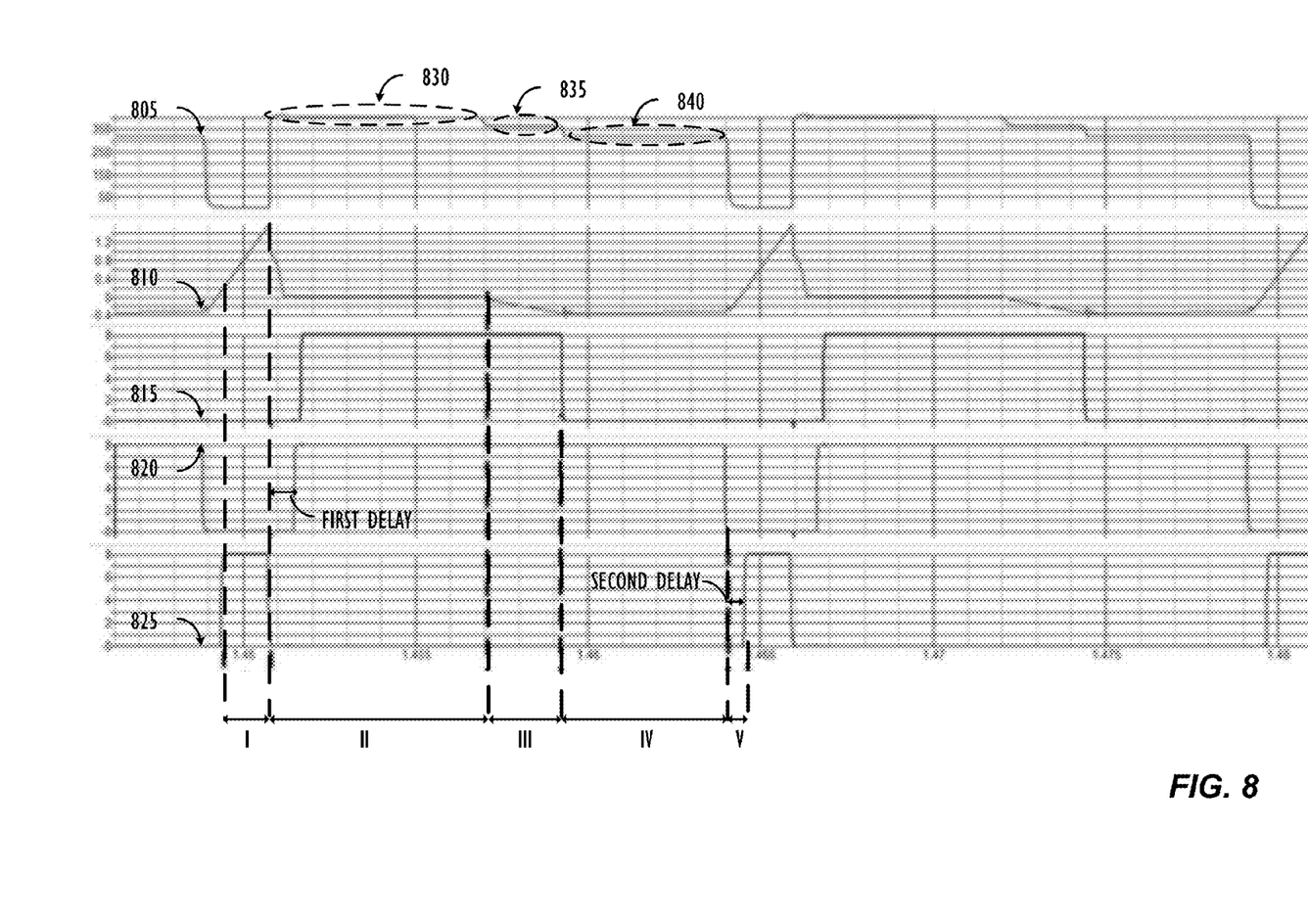
FIG. 8 illustrates waveforms of the voltage across the first switch, the current through the primary coil, and control signals of exemplary flyback converter 100 in Operational Stages I-V in accordance with one embodiment.

FIG. 8 depicts, from top to bottom, time-domain waveforms of voltage $V_{Q1}$ of switch Q1 125, primary current $I_{P1}$ through primary coil P1 105, the second control signal $V_{gs\_Q3}$ of switch Q3 140, the third control signal $V_{gs\_Q2}$ of switch Q2 170, and the first control signal $V_{gs\_Q1}$ of switch Q1 125, in correspondence with the above-described Operational Stages I-V:

In Operational Stage I, the first control signal $V_{gs\_Q1}$ may be asserted (e.g., to a valid high level), as shown by waveform 825, which may turn on switch Q1 125. In reference to the descriptions in FIG. 2, the primary current $I_{P1}$ may increase as illustrated by waveform 810, and the voltage $V_{Q1}$ of switch Q1 125 may become a low voltage drop during conduction as depicted by waveform 805. Energy is transferred from power source 115, and stored in primary coil P1 105 and leakage inductance L1 135.

In Operational Stage II, the first control signal $V_{gs\_Q1}$ may be de-asserted (e.g., to a valid low level), as shown by waveform 825, which may turn off switch Q1 125. Accordingly, the primary current $I_{P1}$ may start to decline as illustrated by waveform 810. After a first delay, the second and third control signals $V_{gs\_Q3}$ and $V_{gs\_Q2}$ may be asserted, as shown by waveforms 815 and 820, respectively, thus turning on switches Q3 140 at ZVS and Q2 170. In reference to the descriptions in FIG. 3, stored energy of primary coil P1 105 may be delivered to the secondary coil S1 110 and load 120, while leakage energy of leakage inductance L1 135 may be transferred to and retained by snubber capacitors C1 145 and C2 150 in series mode. Accordingly, the voltage $V_{Q1}$ across switch Q1 125 may reach the sum of input voltage $V_{IN}$ and voltages across snubber capacitors C1 145 and C2 150, for example, $V_{Q1}=V_{C1}+V_{C2}+V_{IN}\cong 400V$ by using the exemplary numerical values given above, as indicated by the sloping, flat area 830 in waveform 805.

In Operational Stage III, when the energy of primary coil P1 105 is depleted, diodes D2 160 and D3 165 may begin to conduct, thus allowing snubber capacitors C1 145 and C2 150 to transfer the leakage energy that they absorbed in Operational Stage II to primary coil P1 105. In reference to the descriptions in FIGS. 4 and 5, snubber capacitors C1 145 and C2 150 may, in parallel, charge primary P1 105 in a resonant manner with minimum losses and generate a reverse primary current $I_{P1}$, as indicated by waveform 810, for example, primary current $I_{P1}$ may become negative. Accordingly, the voltage $V_{Q1}$ across switch Q1 125 may become the sum of voltage $V_{C1}$ (or $V_{C2}$ if $V_{C2}$ equals to $V_{C1}$) and input voltage $V_{IN}$, for example, $V_{Q1}=V_{C1}+V_{IN}\cong 350V$ by using the exemplary numerical values given above, as indicated by the sloping, flat area 835 in waveform 805.

In Operational Stage IV, when the stored leakage energy in snubber capacitors C1 145 and C2 150 have been transferred to primary coil P1 105, the second control signal $V_{gs\_Q3}$ may be de-asserted, as shown by waveform 815, which may turn off switch Q3 140. In reference to the descriptions in FIG. 6, the reverse primary current $I_{P1}$ may be directed to circulate through switch Q2 170 and diode 175. As the resistivity of the circulating circuit may be configured to be small, the reverse primary current $I_{P1}$ may be held nearly flat, as shown in waveform 810. Accordingly, as switch Q2 170 and diode D5 175 may generate small voltage drops during conduction, the voltage $V_{Q1}$ across switch Q1 125 may drop to input voltage $V_{IN}$, for example, $V_{Q1}\cong V_{IN}=300V$ by using the exemplary numerical values given above, as indicated by the sloping, flat area 840.

In Operational Stage V, the third control signal $V_{gs\_Q2}$ may be de-asserted, as shown by waveform 820, which may turn off switch Q2 170. In reference to the descriptions in FIG. 7, the reverse primary current $I_{P1}$ may be directed to flow through the effective capacitance of switch Q1 125, in a resonant manner with minimum losses, causing the voltage potential at switch Q1 125's drain node 350 to fall towards zero. The reverse primary current $I_{P1}$ of primary coil P1 105 may flow into power source 105, thus recovering the leakage energy from primary coil P1 105 back to power source 115. Note that the exemplary numerical values used in above descriptions are for purposes of illustration only, and that other flyback converter configurations, input voltages, output voltages, turns-ratio and/or diode forward voltage drop may be used.

In reference to the waveforms in FIG. 8, it may now be better understood that flyback converter 100 may operate switches Q1 125 and Q2 170 at fixed frequencies complementarily with each other with the first and second delays, as shown by waveforms 820 and 825. Flyback converter 100 may turn on switch Q3 140 with switch Q2 170 and turn off switch Q3 140 when the reverse primary current $I_{P1}$ reaches the threshold level, as shown by waveforms 815 and 810. The increasing rate of reverse primary current $I_{P1}$ may depend on the leakage energy stored in and delivered by snubber capacitors C1 145 and C2 150, which is further based on the loading condition of flyback converter 100. Thereby, switch Q3 140's turn off time may vary. If flyback converter 100 does not include reverse circulating network 185, which comprises switch Q2 170 and D5 175, flyback converter 100 may have to turn on switch Q1 125 sooner, for example, after a delay once switch Q3 140 is opened, thus causing both switches Q1 125 and Q3 140 to be operated at variable frequencies. Alternatively, flyback converter 100 may still control switch Q1 125 at a fixed frequency but may have to maintain switch Q3 140 on until the next switching cycle of switch Q1 125 in order to provide conductions for the reverse primary current $I_{P1}$. This may cause continuous rising of reverse primary current $I_{P1}$ and end up with a much larger reverse current. Hence, with reverse circulating network 185 formed by switch Q2 170 and D5 175, flyback converter 100 may sustain the fixed frequency operation of switch Q1 125 and meanwhile clamp the reverse primary current $I_{P1}$ to a threshold level.

The various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power conversion apparatus, comprising:
   a primary coil configured to receive an input voltage;
   a secondary coil electromagnetically coupled to the primary coil and configured to provide an output voltage;
   a first switch coupled to the primary coil and configured to control a flow of current through the primary coil based on a first control signal;
   a second switch configured to control, based on a second control signal, a flow of current through a snubber network of an active clamp circuit, the snubber network comprising two or more capacitors configured to charge in series and discharge in parallel, the snubber network coupled in parallel with the primary coil and configured to absorb a leakage energy from a leakage inductance associated with the primary coil and the secondary coil by charging the two or more capacitors;
   a third switch configured to control, based on a third control signal, a flow of current through a reverse circulating network of the active clamp circuit, the reverse circulating network coupled in parallel with the primary coil and configured to clamp the current through the primary coil in a reverse direction to a threshold level; and
   a controller coupled to the first, the second and the third switches, the controller configured to generate the first, the second and the third control signals.

2. The power conversion apparatus of claim 1, wherein the snubber network of the active clamp circuit further comprises first and second capacitors coupled in series with the second switch.

3. The power conversion apparatus of claim 2, wherein the snubber network of the active clamp circuit further comprises a first diode coupled in series with the second switch, whereby the first diode is configured to retain the absorbed leakage energy in the first and second capacitors by disconnecting the first and second capacitors from the primary coil.

4. The power conversion apparatus of claim 3, wherein the snubber network of the active clamp circuit further comprises a second diode coupled in parallel with the first capacitor and the first diode, whereby the second diode is configured to conduct a discharging current of the second capacitor.

5. The power conversion apparatus of claim 3, wherein the snubber network of the active clamp circuit further comprises a third diode coupled in parallel with the second capacitor and the first diode, whereby the third diode is configured to conduct a discharging current of the first capacitor.

6. The power conversion apparatus of claim 1, wherein the reverse circulating network of the active clamp circuit further comprises a fourth diode coupled in series with the third switch.

7. The power conversion apparatus of claim 1, wherein the first control signal is generated to achieve zero voltage switching of the first switch.

8. The power conversion apparatus of claim 1, wherein the second control signal is generated to achieve zero voltage switching of the second switch.

9. The power conversion apparatus of claim 1, further comprising a diode configured to achieve zero voltage switching of the third switch, the diode coupled between the snubber network and the reverse circulating network.

10. A method for operating a power conversion apparatus, the power conversion apparatus comprising primary and secondary coils, the primary coil configured to receive an input voltage, the secondary coil electromagnetically coupled with the primary coil and configured to provide an output voltage, the method comprising:
    generating, with a controller, first, second and third control signals;
    controlling, with a first switch and based on the first control signal, a flow of current through the primary coil in a forward direction;
    controlling, with a second switch and based on the second control signal, a flow of current through the primary coil and a snubber network of an active clamp circuit, the snubber network comprising two or more capacitors configured to charge in series and discharge in parallel, so as to recover an absorbed leakage energy from the primary coil until the flow of current in the reverse direction reaches a threshold level; and
    controlling, with a third switch and based on the third control signal, a flow of current through a reverse circulating network of the active clamp circuit coupled in parallel with the primary coil so as to clamp the current through the primary coil in the reverse direction to the threshold level.

11. The method of claim 10, wherein the snubber network of the active clamp circuit further comprises first and second capacitors coupled in series with the second switch.

12. The method of claim 11, wherein the snubber network of the active clamp circuit further comprises a first diode coupled in series with the second switch, whereby the first diode is configured to retain the absorbed leakage energy in the first and second capacitors by disconnecting the first and second capacitors from the primary coil.

13. The method of claim 12, wherein the snubber network of the active clamp circuit further comprises a second diode coupled in parallel with the first capacitor and the first diode, whereby the second diode is configured to conduct a discharging current of the second capacitor.

14. The method of claim 12, wherein the snubber network of the active clamp circuit further comprises a third diode coupled in parallel with the second capacitor and the first diode, whereby the third diode is configured to conduct a discharging current of the first capacitor.

15. The method of claim 10, wherein the reverse circulating network of the active clamp circuit further comprises a fourth diode coupled in series with the third switch.

16. The method of claim 10, wherein the first control signal is generated to achieve zero voltage switching of the first switch.

17. The method of claim 10, wherein the second control signal is generated to achieve zero voltage switching of the second switch.

18. The method of claim 10, wherein the power conversion apparatus further comprises a diode configured to achieve zero voltage switching of the third switch, the diode coupled between the snubber network and the reverse circulating network.

19. A method of actively clamping a power conversion circuit, the power conversion circuit comprising primary and secondary coils, the primary coil configured to receive an input voltage from a power source, the secondary coil electromagnetically coupled with the primary coil and configured to provide an output voltage, the method comprising:

turning on a first switch so as to store energy in a primary coil;

turning off the first switch and turning on second and third switches so as to transfer a leakage energy associated with the primary and secondary coils to a first and second capacitors by charging the first and second capacitors in series;

retaining the leakage energy in the first and second capacitors by disconnecting the first and second capacitors from the primary coil by using a first diode;

transferring the leakage energy from the first and second capacitors to the primary coil by discharging the first and second capacitors in parallel through second and third diodes;

turning off the second switch so as to clamp a flow of current through the primary coil in a reverse direction by using the third switch and a fourth diode; and turning off the third switch so as to transfer the leakage energy from the primary coil to the power source.

20. The method of claim 19, wherein the second switch is turned on with a first delay after the turning-off of the first switch, so as to achieve zero voltage switching of the first switch.

21. The method of claim 19, wherein the third switch is switched off with a second delay before the next turning-on of the first switch, so as to achieve zero voltage switching of the first switch.

22. The method of claim 19, wherein while being charged, the first and second capacitors are configured to operate in a series resonant manner with the primary coil and a leakage inductance.

* * * * *

UNITED STATES PATENT AND TRADEMARK OFFICE
CERTIFICATE OF CORRECTION

PATENT NO. : 9,923,472 B1
APPLICATION NO. : 15/405901
DATED : March 20, 2018
INVENTOR(S) : Vijay G. Phadke It is certified that error appears in the above-identified patent and that said Letters Patent is hereby corrected as shown below:

In the Claims

Claim number 19 at Column 11, Line numbers 9-10, "with the primary and secondary coils to a first and second capacitors" should be changed to -- with the primary and secondary coils to first and second capacitors --

Signed and Sealed this
Fifth Day of June, 2018

Andrei Iancu
*Director of the United States Patent and Trademark Office*